United States Patent [19]

Upadhyaya et al.

[11] Patent Number: 4,917,029

[45] Date of Patent: Apr. 17, 1990

[54] HYDRO-PNEUMATIC SINGULATION OF GEL-ENCAPSULATED PROPAGULES

[75] Inventors: Shrini K. Upadhyaya, Woodland; Loren D. Gautz, Davis, both of Calif.

[73] Assignee: The Regents of the University of Califorina, Oakland, Calif.

[21] Appl. No.: 207,731

[22] Filed: Jun. 16, 1988

[51] Int. Cl.[4] .......... A01C 7/04; B23Q 7/02

[52] U.S. Cl. .......... 111/185; 221/211; 111/916

[58] Field of Search .......... 111/1, 34, 77, 6, 7, 111/85; 221/211, 278

[56] References Cited

U.S. PATENT DOCUMENTS

| | | | |
|---|---|---|---|
| 2,737,314 | 3/1956 | Anderson | 221/135 |
| 3,770,164 | 11/1973 | Hembree | 221/211 |
| 4,119,242 | 10/1978 | Jesty | 221/211 |
| 4,181,241 | 1/1980 | Currah | 221/211 |
| 4,275,669 | 6/1981 | Atkinson | 111/34 |
| 4,278,183 | 7/1981 | Billingtor | 221/211 |
| 4,285,444 | 8/1981 | Tye | 221/211 |
| 4,399,757 | 8/1983 | Maury | 111/34 |

FOREIGN PATENT DOCUMENTS

| | | | |
|---|---|---|---|
| 224753 | 7/1985 | Fed. Rep. of Germany | 221/211 |
| 2323308 | 4/1977 | France | 111/77 |
| 575060 | 10/1977 | U.S.S.R. | 111/7 |
| 906416 | 2/1982 | U.S.S.R. | 111/6 |

*Primary Examiner*—Danton D. DeMille
*Attorney, Agent, or Firm*—Owen, Wickersham & Erickson

[57] ABSTRACT

A hydro-pneumatic method and apparatus for singulation and delivery of uncoated capsules that consist of gel-encapsulated propagules. The capsules are flowed in water to a metering zone, where a metering disc picks up capsules one at a time successively by vacuum from the metering zone while spacing the capsules at regular intervals. The disc carries the capsules from the water, and then positively blows them from the vacuum at the regularly spaced intervals.

3 Claims, 5 Drawing Sheets

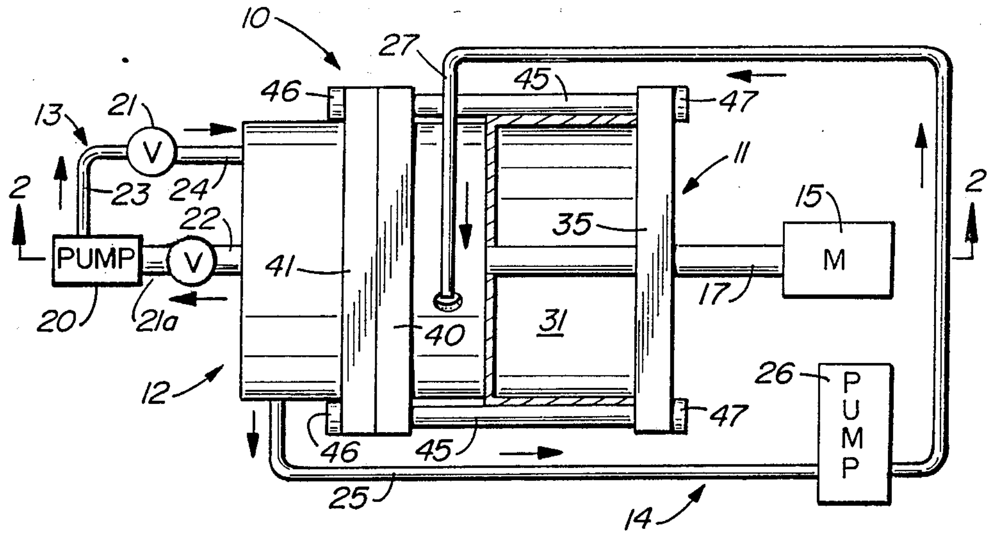
FIG._1
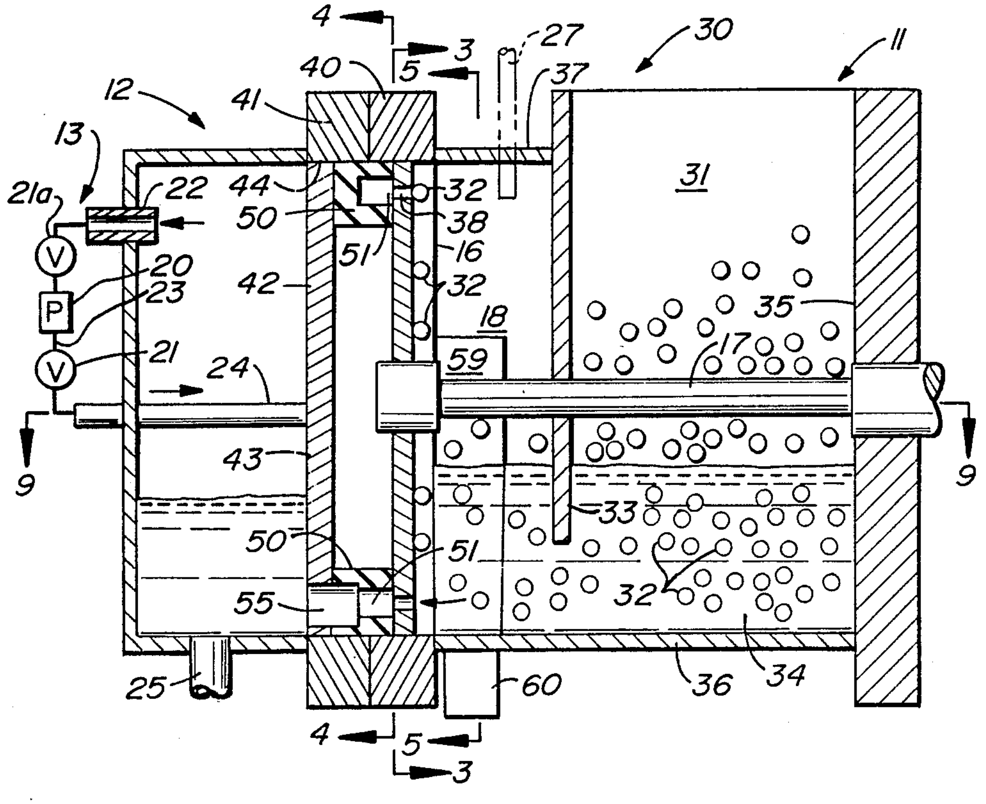
FIG._2

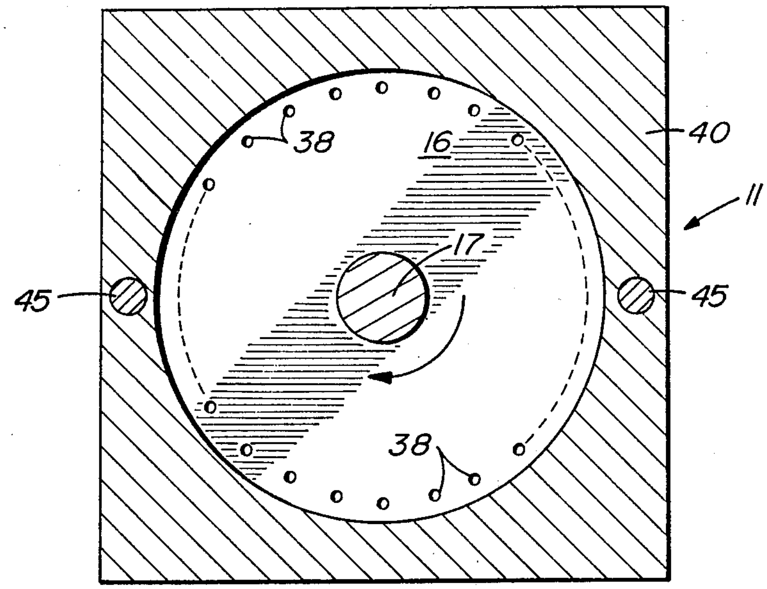
FIG._3
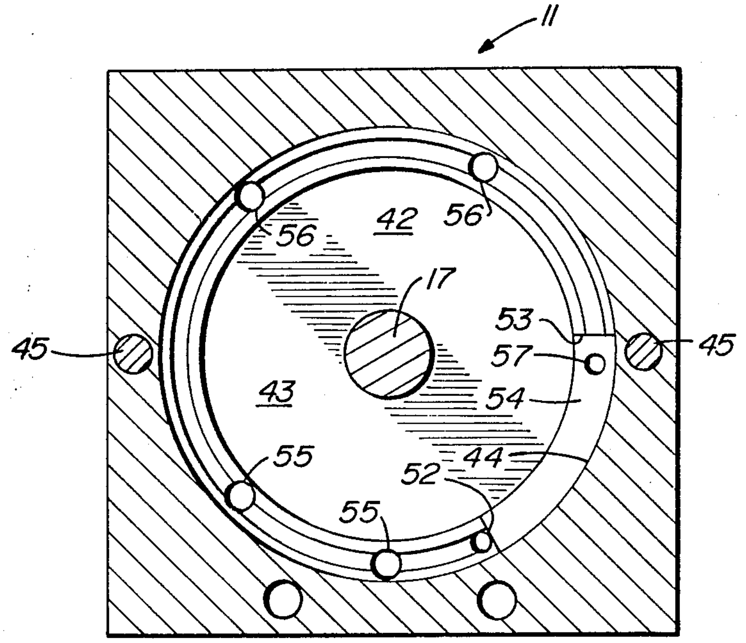
FIG._4

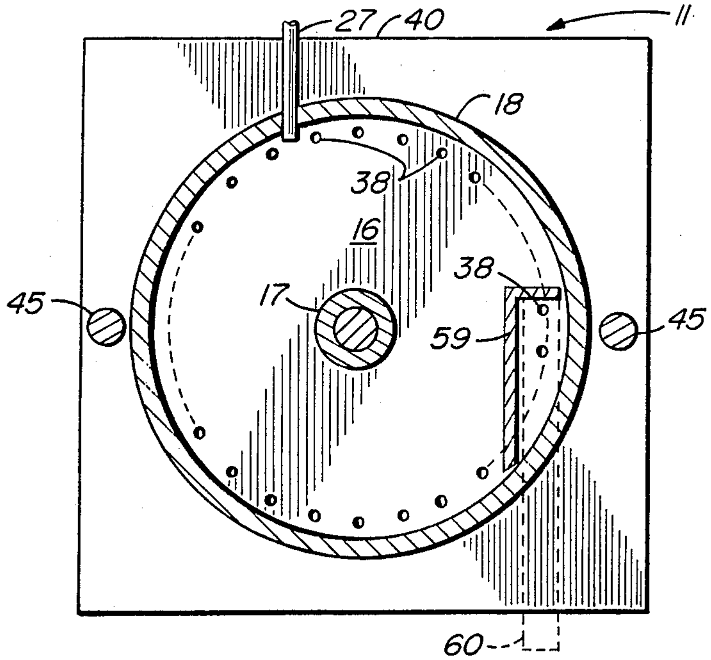
FIG._5
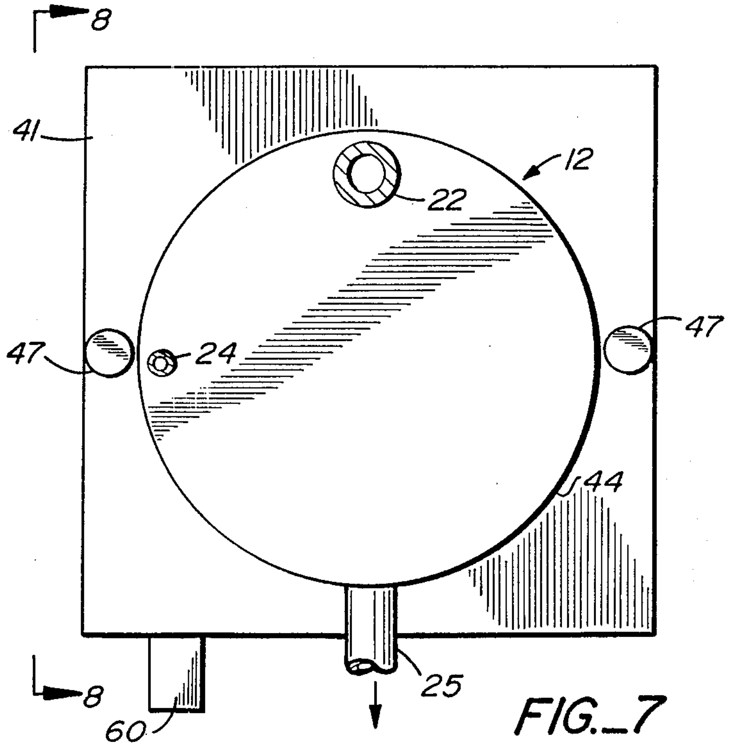
FIG._7

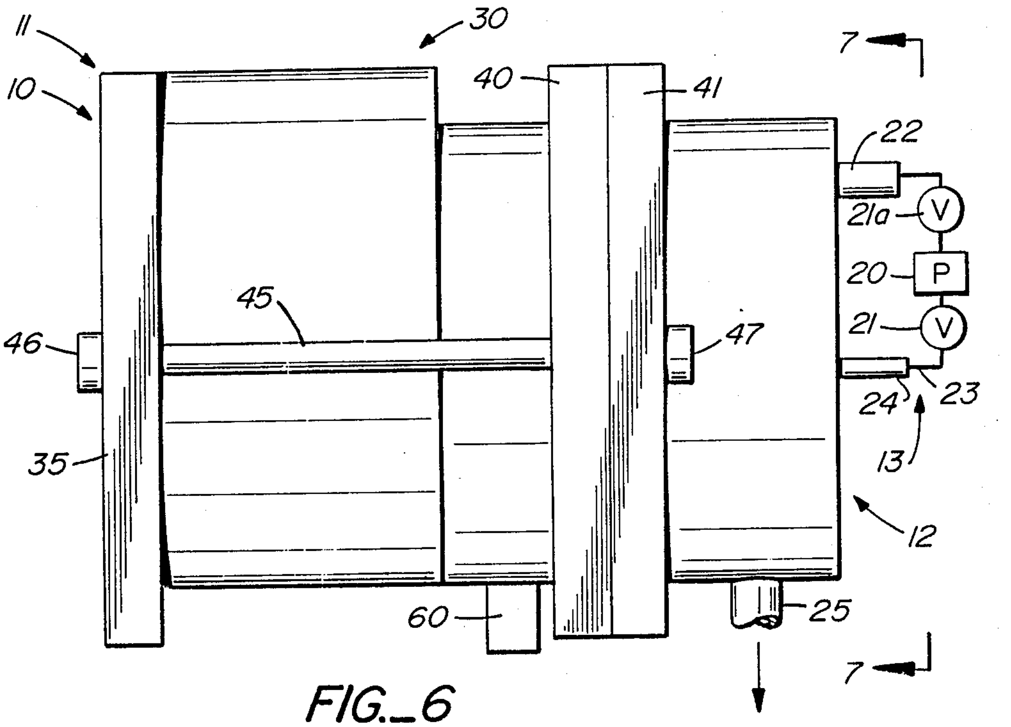
FIG._6
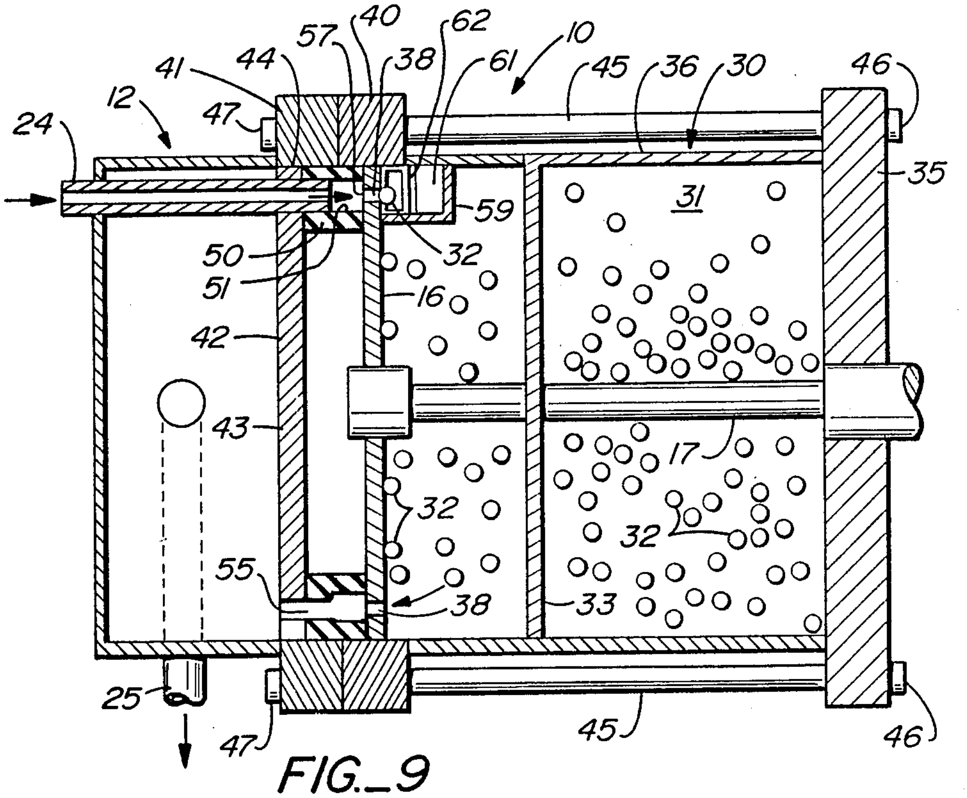
FIG._9

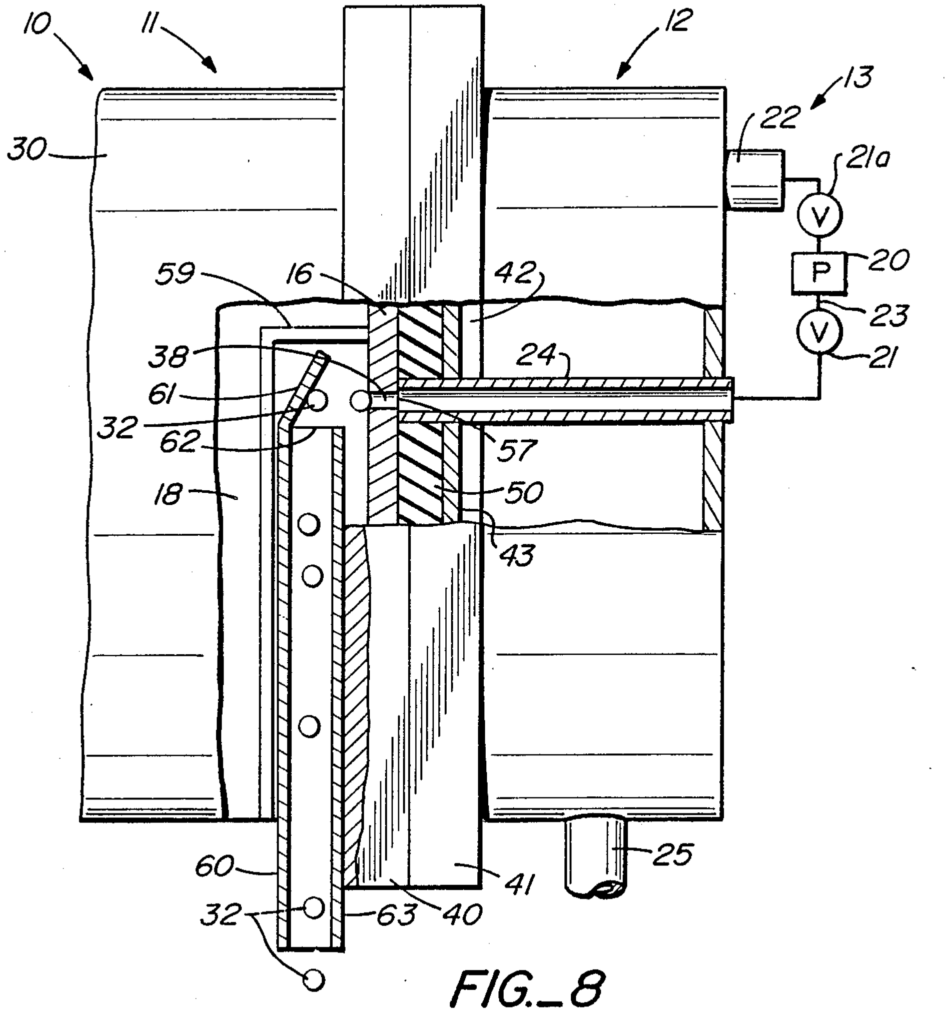
FIG._8
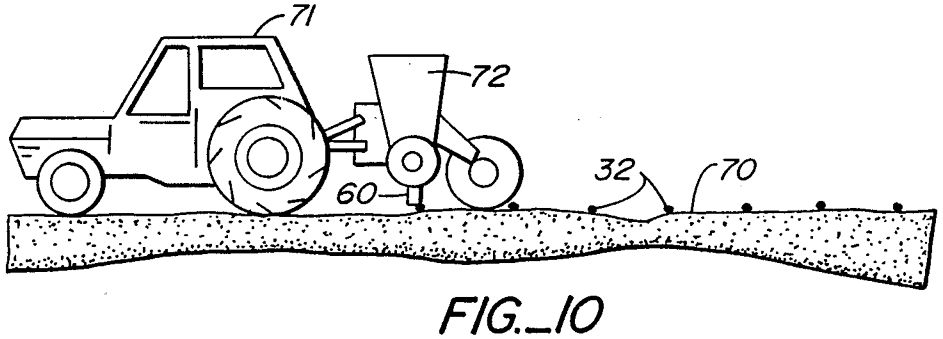
FIG._10

HYDRO-PNEUMATIC SINGULATION OF GEL-ENCAPSULATED PROPAGULES

This invention relates to an improved planting apparatus which uses flows of water and of air singulate and to meter uncoated gel-encapsulated propagules, such as seeds and somatic embryos or bare delicate or fragile propagules, such as pre-germinated seeds.

BACKGROUND OF THE INVENTION

With advances in bio-technology, plant propagules no longer take only the traditional forms of true seeds or large plant parts or cuttings. Plant propagules are now often small and quite delicate. They may be somatic embryos or pre-germinated seeds, for example.

These newer forms of propagules have presented new problems to commercial growers seeking to establish plants; transplanting or gel drilling are the principal prior-art methods used. A proprietary method of encapsulating propagules in gel has recently been developed, in which the encapsulated propagules are uniform spheres and can be handled more easily than can unencapsulated embryos. If the capsules are themselves coated, present equipment can be used to plant them with precision. However, the coating of capsules entails extra expense and may be detrimental to the efficacy and viability of the propagules.

The gel capsules are 90% water, and in uncoated form will maintain a film of water on the surface of the capsules. The surface tension of this water film creates difficulties in handling the capsules. The capsules tend to stick to one another and to any other wettable surface. They become difficult to handle and difficult to singulate in air.

An object of the invention is to singulate uncoated gel capsules and to deliver the uncoated capsules to a planting bed.

Another object is to keep the uncoated capsules from sticking to each other during both singulation and delivery.

Another object is to enable accurate metering of uncoated gel capsules, so that they can be delivered to a propagating bed mechanically at accurately metered intervals.

A further object is to provide apparatus for carrying out both singulation and evenly spaced planting of uncoated gel capsules.

SUMMARY OF THE INVENTION

We have found that uncoated gel capsules are free flowing when they are in water. Therefore, the apparatus of the invention, as well as the method, uses water to prevent the uncoated gel capsules from sticking together or arching across the walls of a hopper during feeding and delivery of the capsules to a metering plate. The invention also uses water to assist in the singulation of the capsules. However, water is not used to deliver the singulated capsules to the planting bed; so that there is no need for continuously replenishing the water. The seeds are freed from the water (the water is recycled), and air alone is used to maintain singulation until the seed is actually dropped to the planting bed. Vacuum is applied on the reverse side of the metering plate to hold the singulated capsules to the metering plate while they are delivered to a drop tube at spaced intervals.

Because both air and water flows are used for the operation of the apparatus of this invention, the apparatus may be called a "hydro-pneumatic seeder", although the invention applies not only to seeds but to other propagules.

A hydro-pneumatic seeder embodying the invention has been built and tested. Operational effectiveness of the seeder has been determined over the normal range of field speed for planting operations and over a range of pressure differentials across the metering plate.

Operational effectiveness of the apparatus has been determined by several factors: the probability of a desired plant site being missed by a capsule, the number of expected multiple capsules per plant site, the row length required until stable conditions are reached, and the number of capsules left in the seeder when stable seeding is no longer possible.

The hydro-pneumatic seeder of this invention meters uncoated gel capsules with only a few misses, and these few are acceptable. The misses have averaged about 1.4%. Multiples—where more than one encapsulated capsule is planted—have been only about 6.0%. Vacuum changes, which have been in the range of 5.9 to 73 kPa, do not affect the operational effectiveness of the seeder. Over the normal range of field operating speeds, 1.44 to 5.76 kilometers per hour (km $hr^{-1}$), the number of multiples decreases slightly as speed increases, and the number of capsules left in the seeder increases slightly.

BRIEF DESCRIPTION OF THE DRAWINGS

FIG. 1 is a generally schematic plan view of a hydro-pneumatic seeder or propagule dispensing device embodying the principles of the invention, showing how the major systems of the device are connected together.

FIG. 2 is an enlarged view of the metering unit and air-water separator of the device of FIG. 1 shown in vertical elevation and in section along the line 2—2 in FIG. 1, and schematically showing other portions of the device. Some capsules are shown.

FIG. 3 is a view in section taken along the line 3—3 in FIG. 2.

FIG. 4 is a view in section taken along the line 4—4 in FIG. 2.

FIG. 5 is a view, on a slightly reduced scale, in section taken along the line 5—5 in FIG. 2.

FIG. 6 is an exterior view in side elevation on a reduced scale of the metering unit of FIGS. 1 and 2.

FIG. 7 is a view in end elevation looking from the right of FIG. 6 and partly in section, looking along the line 7—7 in FIG. 6.

FIG. 8 is an enlarged fragmentary view in side elevation looking from the left of FIG. 7 along the line 8—8 in FIG. 7 and partly cut away and shown in section.

FIG. 9 is a view in section taken along the line 9—9 in FIG. 2.

FIG. 10 is a diagrammatic view illustrating only schematically how a vehicle having the device of FIGS. 1-9 therein dispenses propagules along a row in the ground.

DESCRIPTION OF A PREFERRED EMBODIMENT

A hydro-pneumatic seeder 10 embodying the principles of the invention for singulating and dispensing propagules may include four subsystems, as shown somewhat diagrammatically in FIG. 1: (a) a metering unit 11 that does the actual metering and dispensing, (b) an air-water separator 12, (c) a vacuum source 13, and (d) a water re-circulation system 14.

A variable speed electric motor 15 may drive a metering plate 16 (FIG. 2) through a shaft 17. The metering plate 16 forms part of the metering unit 11 and forms one end of a metering chamber 18 and described in more detail below.

The vacuum source 13 may comprise a wet-and-dry shop-type vacuum cleaner 1.4 kW motor having an air pump 20. The degree or level of vacuum may be controlled by any conventional means, such as valves 21 and 21*a*, as by changing a weight on a plate that covers an orifice. At one end, the pump 20 is connected via a valve 21*a* to a low-pressure or vacuum conduit 22 leading from the air-water separator 12, and at the other end the pump 20 sends air at positive pressure via a conduit 23 to the control valve 21 and thence to a positive-pressure air conduit 24 that is used in a manner described below.

An 165 mm diameter cyclonic air-water separator may be used as the air-water separator 12, and water may be pumped from the air-water separator 12 through a conduit 25 by a variable speed vane pump 26. The separated water may be returned to the metering chamber through a 4 mm i.d. tube 27.

A body 30 contains the metering chamber 18 and the remainder of the metering unit 11, including a main hopper 31 by which the propagule capsules 32 are fed to the metering chamber 18. The hopper 31 has a suitable capacity; in a small unit this may be two liters. A partition or gate 33 separates the upper portion of the hopper 31 from the upper portion of the metering chamber 18 and prevents the capsules 32 from flowing directly from the main hopper 31 into the metering chamber 18, thereby admitting only a desired flow of capsules 32 in water 34 from the lower portion of the hopper 31 below the partition or gate 33 into the lower portion of the metering chamber 18.

One end of the hopper 31 is closed by an end plate 35 of the body 30. A wall 36 encloses the sides and bottom of the body 30 for both the hopper 31 and the metering chamber 18. The upper wall of the hopper 31 is open to air, while a wall 37 closes the upper end of the chamber 18 Thus, the pipe 27 feeds water 34 into the metering chamber 18 from where the water 34 passes under the gate 33 into the hopper 31.

The walls 36 and 37 engage an annular housing member 40, which abuts and is joined to another annular housing member 41. Both housing members 40 and 41 have circular inner peripheries and may have square outer peripheries. The metering plate 16 thus closes one end of the metering chamber 18 and, driven by the shaft 17, rotates inside the annular stationary member 40.

The metering plate 16 may be made from stainless steel; the plate 16 may have an outside diameter of 180 mm or it may be larger or smaller. There may be, for example, forty equally spaced holes 38 2.0 mm in diameter on an 80 mm radius in the metering plate 16.

In addition to the rotating metering plate 16, the metering unit 11 includes a stationary, circular, backing plate 42 which has a planar surface 43 bounding one end of the air-water separator 12 and a circular rim 44, which faces the outer stationary annular member 41, is aligned therewith, and is secured thereto.

As shown in FIGS. 6 and 7 several lengthwise-extending threaded-end rods 45 extend through the end plate 35 and the housing members 40 and 41 and nuts 46 and 47 at the opposite ends of the rods 45 tighten the body 30 securely.

An annular race member 50 is part of or is secured to the backing plate 42 and provides a race 51 which extends as shown in FIG. 4 from an end 52 to an end 53, being closed at each end by a solid portion 54. The end 52 lies at about 5° above vertical, while the end 53 is horizontal The race 51 thus is an annular cavity extending around about 280°. A series of through openings 55 extend through the lower part of the race 51 to conduct water and some air passing through the openings 38 of the metering plate 16, to conduct water from the metering chamber 18 to the air-water separator 12. Through openings 56 connect the upper portion of the race 51 to the air-water separator 12 and are at a vacuum (air at low-pressure) that exerts suction on the openings 38 of the metering plate 16 when they come out of the water, each carrying a capsule 32. The capsules 32 are held by the metering plate 16, due to the vacuum exerted from the race 51, and singulation of the capsules are thereby accomplished.

When an opening 38 of the plate 16 rotates sufficiently in contact with the race's vacuum, it reaches an opening 57 where air at positive pressure from the conduit 24 expels the capsule 32 into the upper end of a drop-tube 60. (FIG. 8). At that point, the capsule 32 strikes and inclined plane 61 at an opening 62 of the drop tube (FIG. 8) and falls down vertically through the drop tube 60 and leaves through the lower end 63 thereof.

The drop tube 60 may extend down through the metering chamber 18 to deliver the capsules 32 to a seedbed 70. The metering chamber 18 includes a water tight recess 59 which contains the drop tube 60. The lower portion of the main hopper 31 is also watertight.

Meanwhile, the water and air have been pulled through the metering plate 16. They may then be conducted by the approximately 8 mm deep by 25 mm wide race 51 to one of the through openings 55 or 56 that may be about 13 mm in inside diameter connected to the air-water separator 12.

To illustrate field operation, FIGS. 10 shows diagrammatically a vehicle 71 with a planter 72 for dropping capsules 32 on a seed bed 70 from a drop tube 60.

Test Operation

An electronic datalogger was used to monitor a test model of the seeder 10 during trials. A pulse generator connected to the metering plate 16 provided pulses that were then converted to the number of holes 34 in a selected period of time. Vacuum was sensed by a full bridge pressure transducer that was calibrated to ±0.025 kPa. Capsules 32 emerging from the drop tube 60 were counted with an optical sensor that generated pulses on "seeing" the leading edge of objects. The optical sensor was capable of detecting leading edges separated by less than 0.1 mm. Water drops were detected as well as capsules; however, this was a problem only in unstable conditions. During stable planting there was no water in the seed tube 60.

The operational effectiveness of the seeder 10 over the range of expected field speeds and the effect of small changes in vacuum level were tested. A two variable, two-level full-factorial with center point provided the needed information. All treatments were replicated five times. The three field speeds simulated were 1.44, 3.6, and 5.76 km $hr^{-1}$. The three vacuum levels were 5.9, 6.6, and 7.3 kPa. To convert from field dimensions to metering holes, plant sites were assumed to be spaced 100 mm apart.

The datalogger was set to record the number of holes 38 in the metering plate 16, the number of capsules 32, and the average vacuum intensity in every ten second period. The vacuum reading was used to determine the variance from the set point during the trial. The number of holes 38 per ten seconds gave a check on the rotational speed of the metering plate 16. The number of capsules 32 minus the number of holes 38 was taken as the number of misses, if negative, or the number of multiples, when positive. Dividing the number of misses or the number of multiples by the number of metering holes 38 gave an estimate of the probability of a missed plant site or of multiples at a plant site, respectively. The cumulative number of holes 38 until the metering stabilized gave an estimate of the length of row necessary to establish stable conditions A trial was considered stabilized when the average number of capsules seeded was within 10% of the number of holes 38 for more than three consecutive sampling periods at the beginning of the trial.

Once the seeder 10 was determined to be stabilized, the 10% criterion was ignored until near the end of the trial. In all trials all capsules 32 were delivered from the hopper 31 to the seedbed 70; however, the number of capsules 32 which were seeded during the period that the number of misses increased to 10% or greater and did not decrease until the end of the trial, were considered to be left in the hopper 31 at the end of the trial.

At the beginning of a trial the vacuum intensity was set, and the metering plate 16 speed was adjusted to the treatment level. The metering plate 16 was then stopped and the vacuum shut off. All the water was in the air-water separator 12. One liter of capsules 32, approximately 13,500 capsules 32, was put into the main hopper 31. Then the water was pumped into the metering chamber 18 until the water level was above the capsules 32 in the metering chamber 18. The vacuum was turned on, and the rotation of the metering plate 16 was started. The water level was maintained above the capsules in the metering chamber 18 but not above the opening 62 to the drop tube 60. The rotational speed of the metering plate 16 was also controlled to the treatment value during the trial. Both water level and metering plate 16 speed were manually controlled.

The turbulence of the water under the gate 33 separating the main hopper 31 from the metering chamber 18 brought the capsules 32 to the metering plate 16. The pressure difference across the metering plate 16 held the capsules 32 to the holes 38; first in the water and then in air. Singulation appeared to be accomplished by two different phenomena: first, the turbulence of the water and absence of surplus capsules in the region just prior to the capsules' exit from the water, and secondly, by the surface tension of the water as the capsules broke the water surface.

Results

Factors affecting operational effectiveness was considered to be any or all of the following: misses per 1000 plant sites, multiples per 1000 sites, the number of metering plate holes 38 passing the drop tube 60 before stable conditions were reached, and the number of capsules 32 left in the seeder 10 when stable seeding was no longer possible. A summary of all the data is shown in Table 1.

TABLE 1

Summary of hydro-pneumatic seeder performance.

| | High speed, low vacuum | | | | | | | High speed, high vacuum | | | | | | |
|---|---|---|---|---|---|---|---|---|---|---|---|---|---|---|
| replicate | 1 | 2 | 3 | 4 | 5 | mean | error | 1 | 2 | 3 | 4 | 5 | mean | error |
| Sites to start | 0 | 1187 | 0 | 0 | 71 | 252 | 524 | 3413 | 0 | 0 | 0 | 123 | 707 | 1514 |
| Capsules at finish | 32 | 506 | 370 | 620 | 784 | 462 | 285 | 329 | 580 | 850 | 546 | 918 | 645 | 240 |
| Average of 10 s samples | | | | | | | | | | | | | | |
| sites | 146 | 153 | 156 | 155 | 154 | 152.8 | 4.0 | 150 | 150 | 153 | 154 | 151 | 151.6 | 1.8 |
| vacuum, kPa | 5.18 | 6.02 | 6.02 | 6.00 | 5.98 | 5.84 | 0.37 | 7.22 | 7.41 | 7.44 | 7.38 | 7.39 | 7.37 | 0.09 |
| capsules | 154 | 158 | 159 | 159 | 162 | 158 | 3 | 154 | 156 | 155 | 159 | 157 | 156 | 2 |
| misses/1000 | 31 | 2 | 3 | 2 | 3 | 8 | 13 | 8 | 4 | 4 | 2 | 2 | 4 | 2 |
| multples/1000 | 88 | 37 | 24 | 31 | 58 | 48 | 26 | 36 | 46 | 23 | 38 | 39 | 36 | 8 |
| Std. error of samples | | | | | | | | | | | | | | |
| sites | 23 | 11 | 6 | 7 | 11 | 13 | | 5 | 17 | 3 | 6 | 4 | 9 | |
| vacuum, kPa | 1.18 | 0.02 | 0.02 | 0.03 | 0.03 | 0.53 | | 0.79 | 0.06 | 0.02 | 0.14 | 0.08 | 0.36 | |
| capsules | 33 | 12 | 5 | 7 | 12 | 17 | | 11 | 18 | 3 | 5 | 4 | 10 | |
| misses/1000 | 86 | 7 | 9 | 9 | 13 | 39 | | 64 | 15 | 9 | 6 | 6 | 30 | |
| multples/1000 | 98 | 30 | 20 | 23 | 41 | 51 | | 30 | 34 | 26 | 30 | 31 | 30 | |
| Number of samples | 81 | 66 | 83 | 87 | 87 | 81 | | 69 | 85 | 81 | 89 | 86 | 82 | |
| Totals × 1000 | | | | | | | | | | | | | | |
| sites | 12.02 | 15.17 | 14.54 | 16.03 | 16.94 | 14.94 | 1.87 | 14.63 | 13.74 | 14.25 | 14.81 | 17.12 | 14.91 | 1.30 |
| capsules | 12.54 | 12.36 | 13.57 | 14.44 | 14.95 | 13.57 | 1.14 | 12.84 | 13.87 | 13.44 | 14.74 | 14.53 | 13.88 | 0.78 |

| | Mid-Point | | | | | | |
|---|---|---|---|---|---|---|---|
| replicate | 1 | 2 | 3 | 4 | 5 | mean | error |
| Sites to start | 845 | 0 | 0 | 52 | 77 | 195 | 365 |
| Capsules at finish | 115 | 1084 | 218 | 564 | 535 | 503 | 379 |
| Average of 10 s samples | | | | | | | |
| sites | 104 | 94 | 94 | 100 | 95 | 97.4 | 4.4 |
| vacuum, kPa | 6.28 | 6.71 | 6.71 | 6.73 | 6.69 | 6.62 | 0.19 |
| capsules | 114 | 98 | 97 | 105 | 101 | 103 | 7 |
| misses/1000 | 31 | 2 | 5 | 2 | 2 | 8 | 13 |
| multples/1000 | 126 | 47 | 46 | 56 | 68 | 69 | 33 |
| Std. error of samples | | | | | | | |
| sites | 9 | 3 | 9 | 8 | 5 | 7 | |
| vacuum, kPa | 1.01 | 0.02 | 0.02 | 0.03 | 0.04 | 0.45 | |
| capsules | 20 | 2 | 9 | 8 | 5 | 11 | |
| misses/1000 | 128 | 5 | 15 | 7 | 9 | 58 | |
| multples/1000 | 109 | 40 | 47 | 43 | 48 | 63 | |
| Number of samples | 109 | 130 | 139 | 134 | 138 | 130 | |

TABLE 1-continued

Summary of hydro-pneumatic seeder performance.

| | | | | | | | | | | | | | | |
|---|---|---|---|---|---|---|---|---|---|---|---|---|---|---|
| Totals × 1000 | | | | | | | | | | | | | | |
| sites | | | | | | | | 12.41 | 15.12 | 13.59 | 15.97 | 15.43 | 14.50 | 1.47 |
| capsules | | | | | | | | 13.33 | 13.83 | 13.75 | 14.71 | 14.51 | 14.03 | 0.57 |

| | Low speed, low vacuum | | | | | | | Low speed, high vacuum | | | | | | |
|---|---|---|---|---|---|---|---|---|---|---|---|---|---|---|
| replicate | 1 | 2 | 3 | 4 | 5 | mean | error | 1 | 2 | 3 | 4 | 5 | mean | error |
| Sites to start | 0 | 168 | 484 | 129 | 310 | 218 | 185 | 1852 | 0 | 1368 | 52 | 52 | 665 | 880 |
| Capsules at finish | 64 | 66 | 32 | 92 | 7 | 52 | 33 | 111 | 8 | 33 | 140 | 88 | 76 | 55 |
| Average of 10 s samples | | | | | | | | | | | | | | |
| sites | 37 | 41 | 40 | 40 | 36 | 38.8 | 2.2 | 44 | 38 | 41 | 41 | 37 | 39.3 | 2.8 |
| vacuum, kPa | 5.87 | 5.99 | 5.90 | 5.90 | 5.90 | 5.91 | 0.05 | 7.41 | 7.15 | 7.34 | 7.37 | 7.33 | 7.32 | 0.10 |
| capsules | 37 | 42 | 41 | 43 | 38 | 40 | 3 | 46 | 40 | 46 | 43 | 37 | 42 | 4 |
| misses/1000 | 46 | 20 | 28 | 12 | 22 | 26 | 13 | 7 | 13 | 13 | 18 | 42 | 19 | 14 |
| multples/1000 | 59 | 65 | 69 | 95 | 104 | 78 | 20 | 44 | 85 | 126 | 84 | 53 | 78 | 32 |
| Std. error of samples | | | | | | | | | | | | | | |
| sites | 10 | 3 | 3 | 3 | 4 | 5 | | 3 | 5 | 4 | 3 | 5 | 4 | |
| vacuum, kPa | 0.51 | 0.06 | 0.26 | 0.48 | 0.42 | 0.38 | | 0.21 | 0.73 | 0.42 | 0.25 | 0.18 | 0.41 | |
| capsules | 10 | 2 | 5 | 7 | 6 | 7 | | 2 | 5 | 7 | 4 | 6 | 5 | |
| misses/1000 | 119 | 33 | 78 | 31 | 36 | 69 | | 16 | 41 | 24 | 35 | 81 | 45 | |
| multples/1000 | 62 | 61 | 94 | 159 | 156 | 115 | | 62 | 105 | 217 | 93 | 68 | 123 | |
| Number of samples | 346 | 317 | 310 | 326 | 360 | 332 | | 234 | 313 | 283 | 332 | 400 | 312 | |
| Totals × 1000 | | | | | | | | | | | | | | |
| sites | 13.01 | 13.28 | 13.13 | 13.69 | 13.21 | 13.26 | 0.26 | 12.39 | 11.92 | 11.49 | 13.76 | 15.59 | 13.03 | 1.66 |
| capsules | 12.94 | 13.71 | 13.42 | 14.31 | 14.39 | 13.75 | 0.61 | 12.94 | 12.67 | 13.15 | 14.52 | 14.89 | 13.63 | 1.00 |

Note that each replicate mean is the average of 60 to 400 samples. The replicate means were averaged and their standard errors calculated (Table 2).

TABLE 2

Response variables versus controlled variables.

Mean / Standard error of replicate mean a. Misses per 1000

| | Mean: Vacuum, kPa | | | Standard error: Vacuum, kPa | | |
|---|---|---|---|---|---|---|
| Speed, Holes/s | 5.9 | 6.6 | 7.3 | 5.9 | 6.6 | 7.3 |
| 16 | 8 | | 4 | 13 | | 2 |
| 10 | | 8 | | | 13 | |
| 4 | 26 | | 18 | 13 | | 14 |
| | | | | | | ave 11.7 |

b. Multiplies per 1000

| | Mean: Vacuum, kPa | | | Standard error: Vacuum, kPa | | |
|---|---|---|---|---|---|---|
| Speed, Holes/s | 5.9 | 6.6 | 7.3 | 5.9 | 6.6 | 7.3 |
| 16 | 48 | | 36 | 26 | | 8 |
| 10 | | 69 | | | 33 | |
| 4 | 78 | | 78 | 20 | | 32 |
| | | | | | | ave 25.6 |

c. Planting sites to start

| | | Mean: Vacuum, kPa | | | Standard error: Vacuum, kPa | | |
|---|---|---|---|---|---|---|---|
| | Speed, Holes/s | 5.9 | 6.6 | 7.3 | 5.9 | 6.6 | 7.3 |
| 1 | 16 | 252 | | 707 | 524 | | 1514 |
| 0 | 10 | | 195 | | | 365 | |
| −1 | 4 | 218 | | 665 | 185 | | 880 |
| | | | | | | | ave 837 |

d. Capsules left at finish

| | Mean: Vacuum, kPa | | | Standard error: Vacuum, kPa | | |
|---|---|---|---|---|---|---|
| Speed, Holes/s | 5.9 | 6.6 | 7.3 | 5.9 | 6.6 | 7.3 |
| 16 | 462 | | 645 | 285 | | 240 |
| 10 | | 503 | | | 379 | |
| 4 | 52 | | 76 | 33 | | 55 |
| | | | | | | ave 239 |

The standard errors were not significantly different and were pooled for an estimate of the standard error of the replicate means.

The two level factorial experiment with a center point allows calculation of a first order model and checks for curvature in the region. The model parameter estimates are shown in Table 3.

TABLE 3

Analysis of the response variables

| Parameter | estimate | t | Significance level |
|---|---|---|---|
| a. Regression of misses per 1000 sites | | | |
| Mean | 14.0 | 2.40 | 5 |
| Vacuum | −2.9 | −0.50 | 65 |
| Speed | −8.0 | −1.37 | 25 |
| Vac × Speed | 0.7 | 0.12 | 70 |
| Curvature | −5.8 | −1.00 | 45 |
| std. error | 5.8 | | |
| degrees of freedom | 4 | | |
| b. Regression of multiples per 1000 sites | | | |
| Mean | 60.1 | 4.69 | 1 |
| Vacuum | −2.9 | −0.22 | 65 |
| Speed | −18.1 | −1.41 | 25 |
| Vac × Speed | −2.7 | −0.21 | 65 |
| Curvature | 9 | 0.68 | 55 |
| std. error | 12.8 | | |
| degrees of freedom | 4 | | |
| c. Regression of sites to start | | | |
| Mean | 460.5 | 1.10 | 30 |
| Vacuum | 225.6 | 0.54 | 60 |
| Speed | 19.0 | 0.05 | 75 |
| Vac × Speed | 2.3 | 0.01 | 75 |
| Curvature | −265.7 | −0.63 | 55 |
| std. error | 418.7 | | |
| degrees of freedom | 4 | | |
| d. Regression of capsules at finish | | | |
| Mean | 308.8 | 2.58 | 5 |
| Vacuum | 51.5 | 0.43 | 65 |
| Speed | 244.7 | 2.05 | 10 |
| Vac × Speed | 39.6 | 0.33 | 65 |
| Curvature | 194.4 | 1.63 | 15 |
| std. error | 119.6 | | |
| degrees of freedom | 4 | | |

There was insufficient evidence to assume any curvature in any of the response surfaces, since none of the quadratic terms were significant. Also, vacuum level for the range tested did not significantly affect any of the responses. Metering plate speed affected only the capsules left in the seeder at the end of seeding.

The predicted value for misses is 14±5 per 1000 planting sites. The prediction for multiples is 60±13 per 1000 planting sites.

The number of planting sites before the seeder 10 would stabilize was highly variable, ranged from 3,413 to 0. None of the model parameters were determined to be different from 0. When the water level fell below the capsule level or the metering chamber 18 filled up with capsules, it became difficult to start metering the capsules. If there was insufficient water, the excess capsules would knock off any capsules already held to the metering plate 16 by the pressure difference causing misses. Multiples would occur if there was sufficient water but the metering chamber 16 was over filled with capsules. Then, capsules stuck to the metering plate 16 only by surface tension had no place to be dislodged to before breaking the water surface. Using the water jet to dislodge these capsules would cause misses by dislodging capsules held to the holes by the pressure difference.

The number of capsules left at the end of stable conditions can be predicted by:

$$\bar{v}=309-245\,(s-3.6)/2.16$$

where;

v=capsules left s=planter speed, km $hr^{-1}$.

The increase in the number of capsules left with an increase in metering plate speed is felt to be due to the shorter time between holes for the capsules to move to the metering plate.

Although all of the predicted responses for the seeder were acceptable for commercial operation, the variation in starting times and the difficulties with maintaining water and capsule levels in the metering chamber were undesirable. Therefore, the seeder 10 was modified to maintain water flow and water levels without additional controls. This was accomplished by attaching a 50 mm portion of the 165 mm-diameter air-water separator 12 to the backing plate 36 and allowing water and air to flow from the race in the backing plate 36 to the chamber 18 unimpeded. Also, the water jet was repositioned to 30° above horizontal just inside the holes 38. The water flow was directed at the metering plate 16, washing the whole plate 16 without dislodging capsules 32 at the holes 38. This enhanced operational effectiveness and eliminated some of the variation in the responses. (Table 5).

Since the primary reason for the modification was to eliminate or reduce the start-up period, limited experiments were conducted to test the modified unit. One set of tests was conducted at the worst condition for starting high speed and high vacuum. A second test point was at low speed and low vacuum to monitor any possible changes in operational effectiveness (Table 4).

TABLE 4

Summary of integrated hydro-pneumatic seeder performance

| | Low speed, low vacuum | | | | | | | High speed, High vacuum | | | | | | |
|---|---|---|---|---|---|---|---|---|---|---|---|---|---|---|
| replicate | 1 | 2 | 3 | 4 | 5 | mean | error | 1 | 2 | 3 | 4 | 5 | mean | error |
| Sites to start | 0 | 0 | 0 | 8 | 23 | 6 | 10 | 23 | 3 | 54 | 17 | 0 | 19 | 22 |
| Capsules at finish | 116 | 109 | 154 | 66 | 228 | 135 | 61 | 242 | 369 | 1067 | 363 | 446 | 497 | 327 |
| Average of 10 s samples | | | | | | | | | | | | | | |
| sites | 44 | 41 | 42 | 38 | 45 | 41.8 | 2.5 | 151 | 156 | 171 | 162 | 158 | 159.6 | 7.5 |
| capsules | 44 | 41 | 43 | 39 | 45 | 43 | 2 | 146 | 149 | 163 | 158 | 153 | 154 | 7 |
| misses/1000 | 15.4 | 23.3 | 27.3 | 6.24 | 24.6 | 19 | 9 | 34.2 | 47.7 | 45.7 | 27.2 | 30.4 | 37 | 9 |
| multples/1000 | 41.7 | 50.1 | 51.1 | 34.1 | 43.1 | 44 | 7 | 2.26 | 1.06 | 0.83 | 2.65 | 1.31 | 2 | 1 |
| Std. error of samples | | | | | | | | | | | | | | |
| sites | 4.14 | 2.91 | 3.33 | 1.87 | 8.51 | 5 | | 3.07 | 9.93 | 3.23 | 11.1 | 3.24 | 7 | |
| capsules | 5.71 | 1.03 | 1.24 | 1.15 | 8.14 | 5 | | 3.81 | 8.72 | 3.93 | 10.2 | 4.26 | 7 | |
| misses/1000 | 24.1 | 38.6 | 30 | 13.4 | 32.6 | 29 | | 27.1 | 31.5 | 26 | 24.5 | 24.3 | 27 | |
| multples/1000 | 135 | 39.4 | 55.8 | 60.1 | 54.3 | 77 | | 9.27 | 4.33 | 3.79 | 7.99 | 4.05 | 6 | |
| Number of samples | 368 | 317 | 378 | 412 | 354 | 366 | | 103 | 99 | 85 | 93 | 95 | 95 | |
| Totals × 1000 | | | | | | | | | | | | | | |
| sites | 16.03 | 12.85 | 15.90 | 15.74 | 15.77 | 15.06 | 1.48 | 15.51 | 15.48 | 14.51 | 15.10 | 15.02 | 15.13 | 0.41 |
| capsules | 16.37 | 13.13 | 16.18 | 16.13 | 15.98 | 15.56 | 1.36 | 15.01 | 14.80 | 13.86 | 14.72 | 14.58 | 14.59 | 0.44 |

TABLE 5

Response variables versus controlled variables for integral seeder.

| Mean | | | | Standard error of replicate mean | | |
|---|---|---|---|---|---|---|
| a. Misses per 1000 | | | | Misses per 1000 | | |
| Speed, Holes/s | 5.9 | 7.3 | | Speed, Holes/s | 5.9 | 7.3 |
| 16 | | 37 | | 16 | | 9 |
| 4 | 19 | | | 4 | 9 | |
| | | | | | 8.88 | |
| b. Multiplies per 1000 | | | | | | |
| Speed, Holes/s | 5.9 | 7.3 | | Speed, Holes/s | 5.9 | 7.3 |
| 16 | | 2 | | 16 | | 1 |
| 4 | 44 | | | 4 | 7 | |
| | | | | | 4.93 | |
| c. Planting sites to start | | | | | | |
| Speed, Holes/s | 5.9 | 7.3 | | Speed, Holes/s | 5.9 | 7.3 |
| 1 16 | | 19 | | 16 | | 22 |
| −1 4 | 6 | | | 4 | 10 | |
| | | | | | 16.8 | |
| d. Capsules left at finish | | | | | | |
| Speed, Holes/s | 5.9 | 7.3 | | Speed, Holes/s | 5.9 | 7.3 |
| 16 | | 497 | | 16 | | 327 |
| 4 | 135 | | | 4 | 61 | |
| | | | | | 235 | |

The improved seeder requires very few planting sites to start. There is no longer a period needed to establish stability of the water level in the metering chamber. Also, the number of multiples per 1000 was much less variable with the improved seeder. The standard error of the replicates' mean value was lowered from 24 to 5 multiples per 1000. Given the level of variability in the original experiment, there was no significant change in any of the other responses.

Conclusions from the Tests (1) The hydro-pneumatic seeder 10 meters uncoated gel capsules with acceptable misses, 1.4%, and multiples, 6.0%.

(2) Vacuum changes in the range of 5.9 to 7.3 kPa did not affect the operational effectiveness of the seeder 10.

(3) Over the normal range of field operating speeds, 1.44 to 5.76 km $hr^{-1}$, operational effectiveness was not unduly affected The number of capsules left in the seeder 10 increases slightly.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A hydro-pneumatic device for singulation and delivery of bare or gel-encapsulated propagules, including in combination:

a metering unit having a lower portion filled with water and an upper air-filled portion above the water, a single, rotatable metering disc in said metering unit, partly in said lower portion and partly in said upper portion, said disc having first and second opposite, radially extending faces, propagule-flowing means for forcing a supply of said propagules in said water against said first face of said rotatable metering disc, said disc having an annular series of transverse openings therethrough, each extending from said first face to said second face, said openings being smaller in diameter than said propagules so that the propagules will not pass through said openings, suction means exerting suction on said openings from said second face for holding said propagules against said openings at said first face, a stationary backing plate with a generally annular race segment facing and sealed rotatable to said metering disc and having a lower end, said race segment extending from near said lower end around about 280° to an upper end of said race segment above said lower end, said suction means being connected to said race segment and therethrough to said metering disc openings in said lower portion and also when they rotate to positions above the water, driving means for rotating said metering disc at a constant speed, so that said openings go from said lower portion with propagules held against said openings at said first face to said upper portion above said water, an air-water separator on the opposite side of said backing plate from said metering disc and continuously connected to said suction means, with through opening means leading from the lower end of said backing plate to said separator for conducting water thereto from the openings through said metering plate, as the plate rotates those openings through the water, and a water pump connected to a lower portion of said air-water separator for pumping water therefrom and connected to said propagule-flowing means for sending water thereto.

2. A hydro-pneumatic device for singulation and delivery of bare or gel-encapsulated propagules, including in combination:

a metering unit having a housing with a hopper into which the propagules are fed, water-supply means for supplying water up to a first predetermined level in said hopper, a metering chamber in said housing and a partition separating said metering chamber from said hopper above a second predetermined level lower than said first predetermined level, a rotatable metering plate in said metering chamber, said plate being a circular disc with first and second opposite parallel faces and an annular first series of through opening means therethrough from said first face to said second face, each said through opening being smaller in diameter than each of the propagules so that the propagules will not go through said openings, a stationary backing plate with an annular race segment opposite to and sealed rotatable to said metering plate and having a lower end, said race segment extending from near said lower end around about 280° to an upper end of said race segment above said lower end, driving means for rotating said metering plate relatively to said backing plate, a source of vacuum, suction means for applying vacuum from said source to an upper portion of said race and therethrough to said metering plate openings when they are above said first level for sucking said propagules against said openings, an air-water separator having a chamber on the opposite side of said backing plate from said metering chamber and connected to said source of vacuum, with second through opening means leading from the lower end of said race to said air-water separator for conducting water to said air-water separator chamber from the openings through said metering plate, as the plate rotates through the water below said first level, said source of vacuum conducting air from the air-water separator, a water pump connected to the lower end of said air-water separator chamber for pumping water therefrom and connected to said water-supply means for sending water to said hopper, positive pressure air-supply means for blowing air through each said metering plate opening from its said second face as said opening passes a predetermined point above said first level, thereby providing a release locus for releasing propagules from said openings at said release locus, and a drop tube at said release locus for receiving propagules one at a time as each said metering plate opening reaches said release locus, for releasing, dropping and thereby delivering the propagules one at a time, spacing them apart by the rotary rate of said metering plate, whereby the propagules are flowed in water to said metering chamber and the vacuum at each opening through said metering plate picks up a propagule from said metering chamber, carries it on said first face, and each propagule is ejected from said metering plate into said drop tube by positive air pressure.

3. A hydro-pneumatic device for singulation and delivery of bare or gel-encapsulated propagules, including in combination:

a metering unit having a housing with a hopper into which the propagules are fed, water-supply means for supplying water up to a first predetermined level in said hopper, a metering chamber, and a partition in separating said metering chamber from said hopper down to a partition edge at a second predetermined level lower than said first predetermined level, the hopper and metering chamber being joined below said edge, a rotatable metering disc plate in said metering chamber with first and second opposite faces and an annular series of transverse openings through said metering disc plate from said first face to said second face, said transverse openings being smaller in diameter than each of the propagules, so that the propagules will not pass through said openings, driving means for rotating said metering plate, a stationary backing plate with a generally annular race opposite to and sealed rotatable to said metering plate and having a lower end, said race segment extending from near said lower end around about 280° to an upper end of said race segment above said lower end, a source of vacuum, suction means for applying vacuum from said source to a lower below-water portion of said race and an upper above-water portion of said race and therethrough to said metering plate openings, when they rotate into an area below said first level, for sucking a propagule against a said opening, and then into an area above said first level, an air-water separator having a chamber on the opposite side of said backing plate from said metering chamber and connected to said source of vacuum, with through opening means leading from the lower end of said race to said air-water separator for conducting water and entrained air to said air-water separator chamber from the openings through said metering plate, as the plate rotates through the water below said first level, said source of vacuum conducting air from the air-water separator, a water pump connected to the lower end of said air-water separator chamber for pumping water therefrom and conducting it to said water-supply means, positive pressure air-supply means for blowing air through each said metering plate opening from its said second face at a predetermined release locus in the rotary path of said opening above said first level, at a release locus, for releasing propagules from said openings at said release locus, and a drop tube having an inlet opening at said release locus for receiving propagules one at a time as each said metering plate opening reaches said release locus, said drop tube having an air outlet opening below said housing for dropping and thereby delivering the propagules one at a time, spacing them apart by the rotary rate of said metering plate, whereby the propagules are flowed in water to said metering chamber, and the vacuum at each opening through said metering plate picks up a propagule from said metering chamber, carries it on said first face above the water level, and each propagule is ejected from said metering plate into said drop tube by positive air pressure.

* * * * *